United States Patent
Wang et al.

(10) Patent No.: US 12,511,333 B2
(45) Date of Patent: Dec. 30, 2025

(54) TRAJECTORY QUERY METHOD AND APPARATUS

(71) Applicant: HANGZHOU ALICLOUD FEITIAN INFORMATION TECHNOLOGY CO., LTD., Hangzhou (CN)

(72) Inventors: Fang Wang, Hangzhou (CN); Jiong Xie, Beijing (CN); Ailin Zhang, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/685,182

(22) PCT Filed: Oct. 26, 2022

(86) PCT No.: PCT/CN2022/127513
§ 371 (c)(1),
(2) Date: Feb. 20, 2024

(87) PCT Pub. No.: WO2023/078131
PCT Pub. Date: May 11, 2023

(65) Prior Publication Data
US 2025/0139171 A1 May 1, 2025

(30) Foreign Application Priority Data
Nov. 2, 2021 (CN) .......................... 202111285663.9

(51) Int. Cl.
G06F 16/90 (2019.01)
G06F 16/908 (2019.01)
G06F 16/909 (2019.01)

(52) U.S. Cl.
CPC .......... G06F 16/909 (2019.01); G06F 16/908 (2019.01)

(58) Field of Classification Search
CPC .............................. G06F 16/908; G06F 16/909
See application file for complete search history.

(56) References Cited

U.S. PATENT DOCUMENTS

2017/0124115 A1* 5/2017 Duan ..................... G06F 16/29

FOREIGN PATENT DOCUMENTS

| CN | 103106280 | 5/2013 |
|---|---|---|
| CN | 110837606 | 2/2020 |

(Continued)

OTHER PUBLICATIONS

X. Guan et al., ST-Hash: An efficient spatiotemporal index for massive trajectory data in a NoSQL database, 2017 25th International Conference on Geoinformatics, 2017 [retrieved Apr. 18, 2025]. Retrieved from the Internet: < doi: 10.1109/GEOINFORMATICS.2017.8090927 >. (Year: 2017).*

(Continued)

Primary Examiner — Kristopher Andersen
(74) Attorney, Agent, or Firm — Wolf, Greenfield & Sacks, P.C.

(57) ABSTRACT

Provided in the present application are a trajectory query method and apparatus. The trajectory query method comprises: acquiring a trajectory query request, which comprises query information of a plurality of types; according to query information of a service type in the query information of the plurality of types, determining a query range of metadata used as a digest of a trajectory, then determining a plurality of pieces of candidate metadata that are within the query range, and determining, from the plurality of pieces of candidate metadata, target metadata that matches the query information of the plurality of types; and acquiring a target trajectory according to the target metadata. By means of the present application, the trajectory query speed can be increased.

20 Claims, 6 Drawing Sheets

(56) References Cited

FOREIGN PATENT DOCUMENTS

| | | |
|---|---|---|
| CN | 112836001 | 5/2021 |
| CN | 113312361 | 8/2021 |
| CN | 113742548 | 12/2021 |
| KR | 20180109378 | 10/2018 |

OTHER PUBLICATIONS

English Translation of International Search Report for International PCT Patent Application No. PCT/CN2022/127513 mailed Jul. 12, 2022 (3 pages).

\* cited by examiner

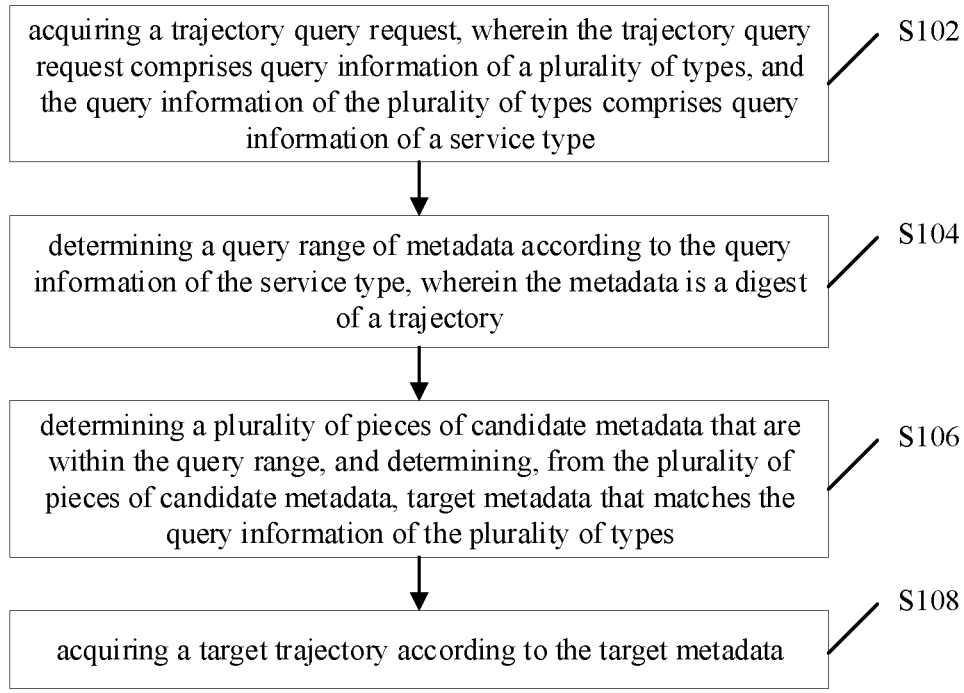

FIG. 1

| Key | Value | | |
|---|---|---|---|
| Row Key | Metadata Column | | Trajectory Column |
| Metadata Identifier $Key1$ | object identifier $id_1$, trajectory start time $st_1$, trajectory end time $et_1$, trajectory start point $sp_1$, trajectory end point $ep_1$, trajectory bounding rectangle $mbr_1$, trajectory signature information $(m_1, n_1, sig_1)$, and count $count_1$ of points included in trajectory | | Trajectory PS1 |
| ⋮ | ⋮ | | ⋮ |
| Metadata Identifier $Keyn$ | object identifier $id_n$, trajectory start time $st_n$, trajectory end time $et_n$, trajectory start point $sp_n$, trajectory end point $ep_n$, trajectory bounding rectangle $mbr_n$, trajectory signature information $(m_n, n_n, sig_n)$, and count $count_n$ of points included in trajectory | | Trajectory PSn |

FIG. 2

TRAJECTORY QUERY METHOD AND APPARATUS

The present application is a U.S. national phase of International PCT Patent Application No. PCT/CN2022/127513, filed Oct. 26, 2022, which claims priority to Chinese patent application No. 202111285663.9, filed with the China Patent Office on Nov. 2, 2021 and entitled "TRAJECTORY QUERY METHOD AND APPARATUS", each of which is incorporated herein by reference in their entirety.

TECHNICAL FIELD

The present application relates to the field of query technology, and in particular to a trajectory query method.

BACKGROUND

With the rapid development of electronic technology, mobile objects such as people, vehicles, ships, and flight devices, and trajectories generated by each mobile object are growing explosively. Accordingly, processing demands for trajectories have increased.

In related technologies, trajectory processing may include trajectory query. Specifically, limited by index depth established in advance for index information, a target trajectory cannot be directly acquired during query. Instead, a plurality of candidate trajectories are acquired through search conditions corresponding to the index information, and then the target trajectory is selected from the plurality of candidate trajectories according to specific needs. However, the volume of candidate trajectories is often large, leading to a slower query speed. Therefore, it is necessary to provide a faster solution.

SUMMARY

An embodiment of the present application provides a trajectory query method. One or more embodiments of the present application further provide a trajectory query apparatus, a computing device, a computer-readable storage medium, and a computer program, so as to solve the technical defects in the prior art.

According to a first aspect of the embodiments of the present application, there is provided a trajectory query method, comprising: acquiring a trajectory query request, wherein the trajectory query request comprises query information of a plurality of types, and the query information of the plurality of types comprises query information of a service type; determining a query range of metadata according to the query information of the service type, wherein the metadata is a digest of a trajectory; determining a plurality of pieces of candidate metadata that are within the query range, and determining, from the plurality of pieces of candidate metadata, target metadata that matches the query information of the plurality of types; and acquiring a target trajectory according to the target metadata.

According to a second aspect of the embodiments of the present application, there is provided a trajectory query apparatus, comprising: a query request acquisition module, configured to acquire a trajectory query request, wherein the trajectory query request comprises query information of a plurality of types, and the query information of the plurality of types comprises query information of a service type; a candidate metadata determination module, configured to determine a query range of metadata according to the query information of the service type, and determine a plurality of pieces of candidate metadata that are within the query range, wherein the metadata is a digest of a trajectory; a target metadata determination module, configured to determine, from the plurality of pieces of candidate metadata, target metadata that matches the query information of the plurality of types; and a target trajectory determination module, configured to acquire a target trajectory according to the target metadata.

According to a third aspect of the embodiments of the present application, there is provided a computing device, comprising: a memory and a processor, wherein the memory is used for storing computer-executable instructions, and the processor is used for executing the computer-executable instructions, and the computer-executable instructions, when executed by the processor, implement the steps of the trajectory query method described above.

According to a fourth aspect of the embodiments of the present application, there is provided a computer-readable storage medium storing computer-executable instructions, wherein the computer-executable instructions, when executed by a processor, implement the steps of the trajectory query method described above.

According to a fifth aspect of the embodiments of the present application, there is provided a computer program, wherein when the computer program is executed in a computer, the computer is caused to execute the steps of the trajectory query method described above.

The above summary is only for the purpose of illustration and is not intended to make limitations in any way. In addition to the schematic aspects, implementations and features described above, further aspects, implementations and features of the present application will be readily understood with reference to the drawings and the following detailed description.

BRIEF DESCRIPTION OF THE DRAWINGS

In the drawings, unless otherwise specified, the same reference numerals throughout several drawings denote the same or similar parts or elements. These drawings may not necessarily be drawn to scale. It should be understood that these drawings only depict some implementations disclosed according to the present application and should not be regarded as limitations of the scope of the present application.

FIG. 1 is a flow chart of a trajectory query method provided in an embodiment of the present application;

FIG. 2 is an exemplary diagram of a corresponding relationship between trajectories and metadata identifiers in a trajectory query method provided in another embodiment of the present application;

DETAILED DESCRIPTION

Figure 3:
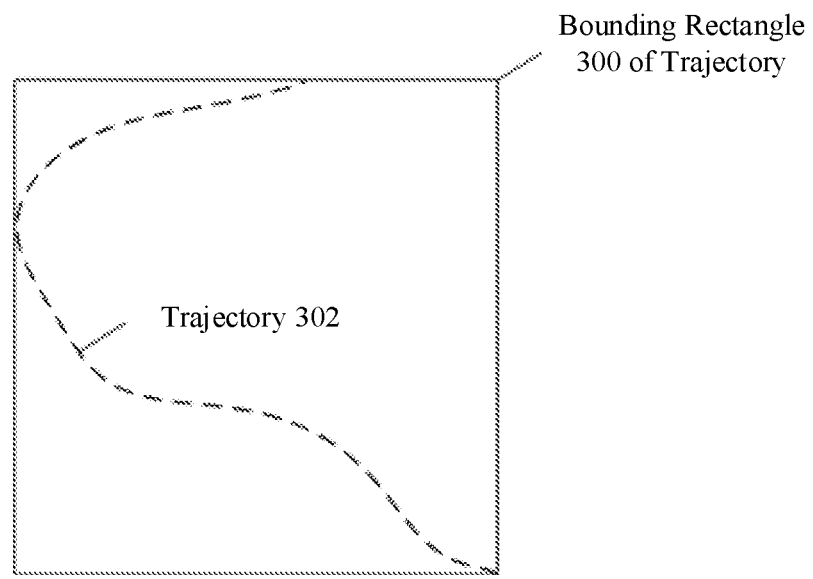
FIG. 3 is an exemplary diagram of a bounding rectangle of a trajectory in a trajectory query method provided in another embodiment of the present application.

Many specific details will be elaborated in the following description to facilitate a full understanding of the present application. However, the present application can be implemented in many other ways different from those described here, and those skilled in the art may conduct similar extensions without going against the connotation of the present application. Thus, the present application is not limited by the specific implementations disclosed below.

Terms used in one or more embodiments of the present application are only for the purpose of describing particular embodiments, and are not intended to limit one or more embodiments of the present application. Singular forms "a/an", "the" and "this" used in one or more embodiments of the present application and the attached claims are also intended to include the plural forms, unless otherwise clearly indicated in the context. It should also be understood that the term "and/or" used in one or more embodiments of the present application refer to and include any or all possible combinations of one or more associated items as listed.

It should be understood that although various information may be described employing terms such as first and second in one or more embodiments of the present application, such information should not be limited to these terms. These terms are only used for distinguishing information of the same type from each other. For example, without departing from the scope of one or more embodiments of the present application, the term "first" may also be referred to as "second", and similarly, "second" may also be referred to as "first". Depending on the context, the word "if" used here may be interpreted as "when" or "as" or "to determine . . . in response to . . . ".

First, nouns or terms involved in one or more embodiments of the present application are explained.

Metadata, also known as intermediary data and relay data, is used to describe data about data. The metadata in the present application is used to describe a trajectory, which is a digest of the trajectory.

Serialization and Deserialization: serialization refers to conversion of an object into a binary array, and deserialization refers to conversion of a binary array into an object.

In the present application, there is provided a trajectory query method. Meanwhile, the present application relates to a trajectory query apparatus, a computing device, and a computer-readable storage medium, which will be described in detail one by one in the following embodiments.

FIG. 1 shows a flow chart of a trajectory query method 100 according to an embodiment of the present application, which specifically comprises the following steps S102 to S108:

At step S102, acquiring a trajectory query request, wherein the trajectory query request comprises query information of a plurality of types, and the query information of the plurality of types comprises query information of a service type.

In some implementations, the query information of the service type specifically may be service information associated with a trajectory. In an embodiment, the query information of the service type may include at least one of a service identifier, spatiotemporal information of a trajectory, and an identifier of a moving object to which a trajectory belongs, etc. For example, the query information of the service type is vehicle management service, vehicle number and spatiotemporal information of a vehicle trajectory. In some implementations, the query information of the service type may be used to indicate the uniqueness of a trajectory corresponding to the query information of the service type, and different trajectories correspond to query information of different service types. In other implementations, query information of a plurality of types, as a whole, may be used as reference features for searching a trajectory.

In some implementations, there may be a plurality of specific means of acquiring a trajectory query request. For example, a trajectory query request sent by a user may be received, or when trigger information of trajectory query is detected, query information of a plurality of types corresponding to the trigger information may be read as a trajectory query request. In a scenario of querying a trajectory according to a preset period to implement applications such as service maintenance and traffic management, the trigger information of trajectory query may comprise: it has been determined that a current time point reaches the preset period. In a scenario of querying a trajectory of a specified moving object, the trigger information of trajectory query may comprise: the specified moving object has been identified.

At step S104, determining a query range of metadata according to the query information of the service type, wherein the metadata is a digest of a trajectory.

In some implementations, there may be multiple means of determining a query range of metadata according to the query information of the service type. A specific explanation will be given below in the form of an exemplary description.

In an embodiment, it is possible to, according to the query information of the service type, search a corresponding relationship established in advance between the query information of the service type and query ranges to obtain a query range of metadata. For example, the corresponding relationship established in advance between the query information of the service type and query ranges comprises that: a vehicle number ID1 and temporal information T1 of a trajectory is corresponding to a query range IN1, a vehicle number ID2 and temporal information T2 of a trajectory is corresponding to a metadata identifier IN2 . . . a vehicle number IDn and temporal information Tn of a trajectory is corresponding to a metadata identifier INn. If the query information of the service type in a trajectory query request is vehicle number range of ID4 to ID100, and temporal information range of T4 to T100, it is therefore determined that the query range of the metadata is IN4 to IN100. The query range specifically may be a storage location range of the metadata, or an identifier range of the metadata, etc.

In another embodiment, the query information of the service type may be input into a specified hash model to obtain the query range of the metadata. The specified hash model is a model used for obtaining an identifier of the metadata or an identifier of a storage location of the metadata. For example, the hash model specifically may be a message digest algorithm (MD5, a widely used cryptographic hash function that can produce a 128-bit (16-byte) hash value), or a secure hash algorithm 1 (SHA-1, a cryptographic hash function that can generate a 160-bit (20-byte) hash value called a message digest, the hash value usually presented in the form of 40 hexadecimal numbers). For example, a query range of the service type in the trajectory query request is vehicle number ID4 to ID100, and a temporal information range of T4 to T100. Then vehicle number ID4 and temporal information range T4 are input into the specified hash model to obtain an upper limit of the query range of the metadata, and vehicle number ID100 and temporal information range T100 are input into the specified hash model to obtain a lower limit of the query range of the metadata. A range formed by the upper limit and the lower limit is the query range of the metadata.

Any means of determining a query range of metadata according to the query information of the service type may be used in the present application, and the embodiments of the present application make no limitation in this regard.

At step S106, determining a plurality of pieces of candidate metadata that are within the query range, and determining, from the plurality of pieces of candidate metadata, target metadata that matches the query information of the plurality of types.

In some implementations, the determining a plurality of pieces of candidate metadata that are within the query range may comprise: according to the query range, searching candidate metadata from a plurality of pieces of metadata having been stored, so as to obtain the plurality of pieces of candidate metadata that are within the query range. In other implementations, for different query information, there may be multiple means of determining target metadata that matches the query information of the plurality of types. In order to facilitate understanding and reasonable layout, a specific explanation will be given later in the form of an optional embodiment.

At step S108, acquiring a target trajectory according to the target metadata.

In some implementations, there may be multiple means of acquiring a target trajectory according to the target metadata. For example, a trajectory corresponding to the target metadata may be directly searched to obtain the target trajectory. Alternatively, for example, different query information may correspond to different query granularities, and, therefore, in order to ensure the accuracy of the target trajectory, it is possible to determine a query type corresponding to the query information of the plurality of types; search, from a corresponding relationship established in advance between query types and acquisition manners, a target acquisition manner corresponding to the determined query type; and according to the target metadata, acquire the target trajectory by utilizing the target acquisition manner. In order to facilitate understanding and reasonable layout, the second example will be specifically explained later in the form of an optional embodiment.

In some embodiments, by determining this target metadata from the plurality of pieces of candidate metadata as determined by utilizing the query range, reduction in processing speed caused by determining the target metadata from all metadata may be greatly alleviated. Moreover, the metadata is a digest of a trajectory, which is smaller in size than the trajectory. Therefore, by determining, from the plurality of pieces of candidate metadata, the target metadata that matches the query information of the plurality of types, thereby acquiring a target trajectory according to the target metadata, reduction in processing speed caused by processing non-target trajectories may be greatly alleviated. Therefore, by means of this solution, the trajectory query speed can be increased.

In some implementations, prior to the acquiring a trajectory query request, the trajectory query method provided in the embodiments of the present application may further comprise the following steps: for each trajectory having been stored, generating metadata used for describing the trajectory; serializing each piece of metadata respectively and inserting serialized metadata into a corresponding trajectory, to obtain a processed trajectory; processing each piece of metadata respectively according to a preset identifier generation manner, to obtain a metadata identifier of the metadata; and establishing a corresponding relationship between the processed trajectories and the metadata identifiers.

In some embodiments, for each trajectory having been stored, to generate metadata used for describing the trajectory, it is possible to utilize a pre-trained neural network model to respectively extract features of each trajectory having been stored, to obtain metadata used for describing the trajectory. Alternatively, each trajectory having been stored may be manually analyzed, and according to an analysis result, metadata used for describing the trajectory is constructed. Alternatively, for any trajectory, any one of an object identifier of a moving object to which the trajectory belongs and spatiotemporal information is obtained and used as metadata of the trajectory. For example, the neural network model is trained by utilizing sample trajectories and metadata labels of the sample trajectories. In some embodiments, there may be multiple preset identifier generation manners. For example, it is possible to search a corresponding relationship established in advance between metadata and identifiers to obtain a metadata identifier of each piece of metadata. Alternatively, for example, it is possible to input metadata into a preset hash model to obtain a metadata identifier of this metadata. In some embodiments, the establishing a corresponding relationship between the processed trajectories and the metadata identifiers specifically may comprise: calling a data writing interface, using the metadata identifiers as keys, and using the processed trajectories as values, and writing the same into a predefined data table.

For example, the predefined data table is as shown in FIG. 2, an exemplary diagram 200 of a corresponding relationship between trajectories and metadata identifiers in a trajectory query method provided in another embodiment of the present application.

In the predefined data table, each row value corresponds to one key, and the key therefore may be called a row key. A processed trajectory includes the trajectory itself and metadata inserted into the trajectory. Therefore, the value may include two kinds of data in metadata column and trajectory column. For example, the predefined data table stores a metadata identifier Key1, . . . , and a metadata identifier Keyn, which respectively correspond to a trajectory PS1, . . . , and a trajectory PSn. Metadata inserted into trajectory PS1 may include: an object identifier id1, a trajectory start time st1, a trajectory end time et1, a trajectory start point sp1, a trajectory end point ep1, a trajectory bounding rectangle mbr1, and trajectory signature information (m1, n1, sig1), and a count count1 of points included in trajectory PS1. Metadata inserted into trajectory PSn is similar to the metadata inserted into trajectory PS1. The distinction lies in that specific metadata content varies among different trajectories. Trajectory bounding rectangle mbr1 and trajectory signature information (m1, n1, sig1) are used to characterize spatial position information of a trajectory, which will be specifically explained in subsequent optional embodiments.

In this embodiment, by serializing metadata and inserting serialized metadata into a corresponding trajectory, a corresponding relationship between metadata and trajectories may be efficiently established. Moreover, by establishing a corresponding relationship between trajectories inserted with metadata and metadata identifiers, it is possible to ensure that the metadata identifiers are utilized in subsequent trajectory query to achieve determination of candidate metadata, thereby improving trajectory query efficiency.

In some implementations, the above metadata comprises an object identifier of a moving object to which a trajectory belongs and/or spatiotemporal information of the trajectory; and the query information of the plurality of types comprises a reference object identifier and/or a reference spatiotemporal range.

In some embodiments, the determining, from the plurality of pieces of candidate metadata, target metadata that matches the query information of the plurality of types may comprise the following steps: determining, from the plurality of pieces of candidate metadata, candidate metadata with an object identifier identical to the reference object identifier as the target metadata; and/or, determining, from the plurality of pieces of candidate metadata, candidate metadata with spatiotemporal information intersecting with the reference spatiotemporal range as the target metadata.

In the embodiments of the present application, for query information for which an amount of data processed during matching is relatively small and which has uniqueness, that is, a reference object identifier, then candidate metadata with an object identifier identical to the reference object identifier is determined as the target metadata; and for query information for which an amount of data processed during matching is relatively large, that is, spatiotemporal information, then candidate metadata with spatiotemporal information intersecting with the reference spatiotemporal range is determined as the target metadata. Therefore, the embodiments of the present application employ matching manners corresponding to different query information to match candidate metadata, which may alleviate reduction in matching efficiency caused by employing one and the same matching manner for all query information, thereby further improving trajectory query efficiency.

In some embodiments, the above spatiotemporal information of the trajectory specifically may comprise at least one of temporal information and spatial information of the trajectory. The reference object identifier is equivalent to an object identifier of a moving object to which the trajectory as queried belongs, and the reference object identifier may be an object identifier range. For example, the reference object identifier may be aircraft identifiers A1 to An. The reference spatiotemporal range is equivalent to a spatiotemporal range of the trajectory as queried, and specifically may comprise at least one of a temporal range and a spatial range of the trajectory. Moreover, for reference spatiotemporal ranges with different heights, the target metadata is determined by different manners, which will be specifically explained below in the form of an optional embodiment.

In some implementations, the above spatiotemporal information comprises: a bounding rectangle of the trajectory; and the reference spatiotemporal range comprises a reference spatial position range.

In some embodiments, the above determining, from the plurality of pieces of candidate metadata, target metadata that matches the query information of the plurality of types specifically may comprise the following steps: determining a spatial position range of an area formed by a bounding rectangle of each trajectory; respectively determining whether the spatial position range of the area formed by the bounding rectangle of each trajectory intersects with the reference spatial position range; and if the spatial position range of the area formed by the bounding rectangle of a certain trajectory is determined to be intersected with the reference spatial position range, determining that candidate metadata to which the bounding rectangle of the certain trajectory belongs is the target metadata.

In some embodiments, the bounding rectangle of a trajectory refers to an outer frame with a geometric shape that can completely include the trajectory. The geometric shape may be a circle, a rectangle, a trapezoid, etc., which specifically may be shaped according to needs. Moreover, in order to reduce the amount of the metadata and improve the accuracy of the features of the trajectory characterized by the metadata, the bounding rectangle of the trajectory may be a minimum bounding rectangle. If there are boundary points in four directions of the trajectory, i.e., on an upper part, lower part, left side and right side thereof, then these boundary points are on boundary lines of the bounding rectangle. Moreover, in order to facilitate trajectory management, the trajectory is usually a collection of points in a two-dimensional coordinate system. Correspondingly, the bounding rectangle of the trajectory is also a geometric shape in the two-dimensional coordinate system.

For example, FIG. 3 shows an exemplary diagram of a bounding rectangle of a trajectory in a trajectory query method provided in another embodiment of the present application. As shown, upper, left and lower boundary points of a trajectory 302 are all on boundary lines of a trajectory bounding rectangle 300. Therefore, trajectory bounding rectangle 300 is the minimum bounding rectangle. On this basis, a spatial position range of an area formed by the bounding rectangle of a trajectory intersects with the reference spatial position range, indicating that at least part of the trajectory belongs to a reference spatial position area, and this trajectory is very likely to be the trajectory as queried. Therefore, it may be determined that candidate metadata to which the bounding rectangle of this trajectory belongs is the target metadata.

In some implementations, in order to facilitate trajectory management, a point included in a trajectory usually has geographical position information corresponding to this point, such as longitude and latitude.

In an embodiment, a boundary point of a bounding rectangle of a trajectory has geographical position information corresponding to this boundary point. Therefore, the determining a spatial position range of an area formed by a bounding rectangle of each trajectory may comprise: for each trajectory, using geographical position information of a start point sp1 of this trajectory as an upper limit of the above spatial position range, and using geographical position information of an end point ep1 of this trajectory as a lower limit of the above spatial position range.

In another embodiment, the determining a spatial position range of an area formed by a bounding rectangle of each trajectory may comprise: reading geographical position information of boundary points of the bounding rectangle of the trajectory, and according to the geographical position information of the boundary points, searching a corresponding relationship established in advance among boundary points, upper limits of the spatial position ranges and lower limits of the spatial position ranges, to obtain an upper limit and a lower limit of the spatial position range of the area formed by the bounding rectangle. Bounding rectangle 300 of the trajectory in FIG. 3 of the present application is taken as an example. Boundary points of bounding rectangle 300 include: an upper left vertex, an upper right vertex, a lower left vertex and a lower right vertex. Therefore, a spatial position range of an area formed by bounding rectangle 300 covers [longitude and latitude of the upper left vertex, longitude and latitude of the lower right vertex], [longitude and latitude of the upper right vertex, longitude and latitude of the lower left vertex], [longitude and latitude of the upper left vertex, longitude and latitude of the lower left vertex],

[longitude and latitude of the upper right vertex, longitude and latitude of the lower right vertex], [longitude and latitude of the upper left vertex, longitude and latitude of the upper right vertex] and [longitude and latitude of the lower left vertex, longitude and latitude of the lower right vertex].

Any manner of determining a spatial position range of an area formed by a bounding rectangle of each trajectory may be used in the present application, and the embodiments of the present application make no limitation in this regard.

In the embodiments of the present application, the bounding rectangle of the trajectory is used to characterize the spatial position information of the trajectory, which may satisfy both the accuracy of the spatial position information of the trajectory and the reduction in the amount of the metadata, compared with directly using geographical position information of each point in the trajectory to characterize the spatial position information of the trajectory.

In some implementations, the above spatiotemporal information further comprises bounding rectangles of respective sub-trajectories, and the respective sub-trajectories are a plurality of trajectory segments obtained by segmenting the trajectory.

In an embodiment, the determining that candidate metadata to which the bounding rectangle of the certain trajectory belongs is the target metadata specifically may comprise the following steps: respectively determining spatial position ranges of areas formed by bounding rectangles of respective sub-trajectories corresponding to the certain trajectory; determining whether a spatial position range of an area formed by a bounding rectangle of at least one sub-trajectory intersects with the reference spatial position range; and if so, determining that candidate metadata to which the bounding rectangle of the at least one sub-trajectory belongs is the target metadata.

In an embodiment, the bounding rectangle of a sub-trajectory is similar to the bounding rectangle of a trajectory. The distinction lies in that it is the sub-trajectory included therein. The same parts will not be repeated here, and the details thereof may refer to the description of the bounding rectangle of the trajectory in the above embodiments. Moreover, there may be multiple specific manners of segmenting the trajectory to obtain the above respective sub-trajectories. For example, the trajectory may be divided according to a preset trajectory segment length to obtain a plurality of trajectory segments as sub-trajectories of the trajectory. Alternatively, for example, the bounding rectangle of the trajectory may be divided according to a specified shape to obtain a plurality of sub-bounding rectangles, and trajectory segments included in the sub-bounding rectangles are sub-trajectories of the trajectory included in the bounding rectangle of the trajectory. The sub-bounding rectangles are bounding rectangles of corresponding sub-trajectories. Division may be performed on an equal basis or according to a specified size.

Figure 4:
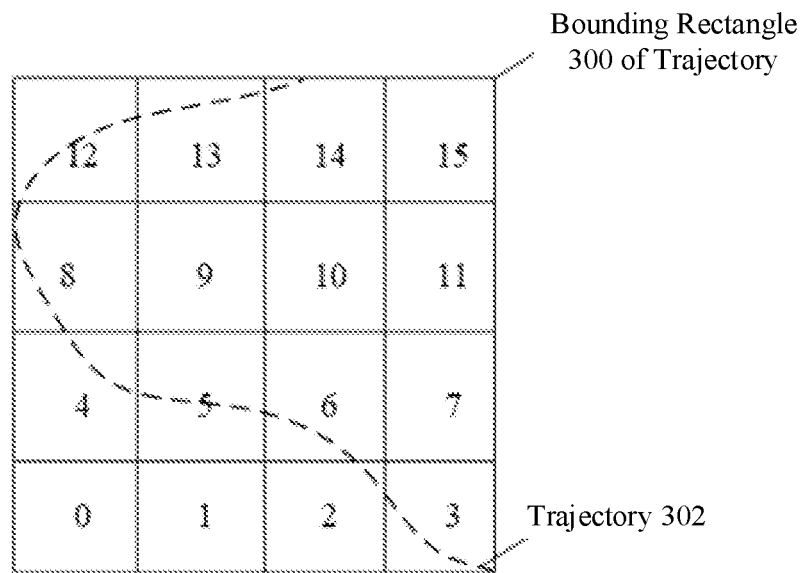
FIG. 4 is an exemplary diagram of a bounding rectangle of a sub-trajectory in a trajectory query method provided in another embodiment of the present application.

For example, FIG. 4 shows an exemplary diagram of bounding rectangles of sub-trajectories in a trajectory query method provided in another embodiment of the present application. Bounding rectangle 300 of the trajectory is equally divided into m×m sub-rectangles, such as 4×4 sub-rectangles. Each sub-rectangle is numbered from 0 to 15 in an order set in advance. In this way, sub-rectangle 2, sub-rectangle 3, sub-rectangle 4, sub-rectangle 5, sub-rectangle 6, sub-rectangle 8, sub-rectangle 12, sub-rectangle 13 and sub-rectangle 14 each include one sub-trajectory of trajectory 302. Moreover, in order to reduce storage costs and improve data processing efficiency, a relationship between each sub-trajectory and the bounding rectangle of the trajectory may be recorded through signature information of the trajectory. For example, one array is used to record a position that each sub-trajectory passes through in the bounding rectangle of the trajectory: positions of elements in the array are respectively corresponded to the above serial numbers, and an element corresponding to a serial number of a sub-rectangle including a sub-trajectory is assigned a value of 1, and an element corresponding to a serial number of a sub-rectangle not including the sub-trajectory is assigned a value of 0. On this basis, division information of the bounding rectangle of the trajectory is recorded to obtain the signature information of the trajectory. For example, positions through which respective sub-trajectories of trajectory 302 in the above FIG. 4 passes in bounding rectangle 300 of the trajectory is sig=(0011 1110 1000 1110). In this way, the signature information of the trajectory is (4, 4, sig).

In an embodiment, there may be multiple manners of respectively determining spatial position ranges of areas formed by bounding rectangles of respective sub-trajectories corresponding to the trajectory. For example, if there are recorded in advance geographical position information of start points and geographical position information of end points of the respective sub-trajectories, then for each sub-trajectory, geographical position information of the start point and geographical position of the end point of this sub-trajectory may be directly used as a spatial position range of an area formed by a bounding rectangle of this sub-trajectory. Alternatively, for example, according to the above signature information of the trajectory and the geographical position information of the boundary points of the trajectory, it is possible to respectively determine geographical position information of boundary points of the bounding rectangles of respective sub-trajectories; for each sub-trajectory, according to the geographical position information of the boundary points of the bounding rectangle of the sub-trajectory, it is possible to search a corresponding relationship established in advance among boundary points, upper limits of the spatial position ranges and lower limits of the spatial position ranges, to obtain an upper limit and a lower limit of the spatial position range of the area formed by the bounding rectangle of this sub-trajectory.

In the embodiments of the present application, respective sub-trajectories are a plurality of trajectory segments obtained by segmenting a trajectory. Therefore, it is possible to perform a finer-granularity comparison between candidate metadata and the reference spatial position range by further determining whether a spatial position range of an area formed by a bounding rectangle of at least one sub-trajectory intersects with the reference spatial position range, thereby improving the accuracy of the target metadata determined from the spatial position information. Moreover, the spatial position range of the sub-trajectory is characterized by the bounding rectangle of the sub-trajectory, which may satisfy both the accuracy of the spatial position information of the trajectory and the reduction in the amount of the metadata, compared with directly using geographical position information of each point in the trajectory to characterize the spatial position information of the trajectory.

In some implementations, the above metadata may comprise temporal information and spatial position information of the trajectory; and the reference spatiotemporal range comprises a reference spatial position range and a reference temporal range.

In an embodiment, the determining, from the plurality of pieces of candidate metadata, candidate metadata with spatiotemporal information intersecting with the reference spatiotemporal range as the target metadata specifically may comprise the following steps: according to temporal information of a trajectory in each piece of candidate metadata, respectively determining a temporal range corresponding to each piece of candidate metadata; respectively determining whether the temporal range corresponding to each piece of candidate metadata intersects with the reference temporal range, and if the temporal range corresponding to a certain candidate metadata is determined to be intersected with the reference temporal range, determining a spatial position range corresponding to the certain candidate metadata according to the spatial position information of the trajectory in the certain candidate metadata; and determining whether the spatial position range corresponding to the certain candidate metadata intersects with the reference spatial position range, and if so, determining that the certain candidate metadata is the target metadata.

In an embodiment, the reference spatiotemporal range comprises the reference spatial position range and the reference temporal range, which is equivalent to query all trajectories that pass through a specified spatial position range in the reference temporal range. Moreover, data processing for a temporal range involves less amount of data and achieves higher efficiency than data processing for a spatial position range. Therefore, in order to reduce the amount of data processed for the spatial position range and further improve trajectory query efficiency, considering a situation that the reference spatiotemporal range comprises the reference spatial position range and the reference temporal range, it is possible to perform screening for the metadata according to the reference temporal range, and then screen, based on the reference spatial position range, candidate metadata with a temporal range intersecting with the reference temporal range, so as to obtain the target metadata.

In an embodiment, according to temporal information of a trajectory in each piece of candidate metadata, respectively determining a temporal range corresponding to each piece of candidate metadata specifically may comprise: for each piece of candidate metadata, using a start time of the trajectory in the candidate metadata as an upper limit of the temporal range corresponding to the candidate metadata, and using an end time of the trajectory in the candidate metadata as a lower limit of the temporal range corresponding to the candidate metadata. Moreover, a specific manner of determining a spatial position range corresponding to the candidate metadata according to the spatial position information of the trajectory in the candidate metadata is the same as the step expressed above in the optional embodiment regarding the reference spatiotemporal range comprising the reference spatial position range. This will not be repeated here, and the details thereof may refer to the description of the optional embodiment regarding the reference spatiotemporal range comprising the reference spatial position range.

In some implementations, the metadata comprises temporal information of the trajectory; and the reference spatiotemporal range comprises a reference temporal range.

In an embodiment, the determining, from the plurality of pieces of candidate metadata, candidate metadata with spatiotemporal information intersecting with the reference spatiotemporal range as the target metadata specifically may comprise the following steps: according to temporal information of a trajectory in each piece of candidate metadata, respectively determining a temporal range corresponding to each piece of candidate metadata; and respectively determining whether the temporal range corresponding to each piece of candidate metadata intersects with the reference temporal range, and if the temporal range corresponding to a certain candidate metadata is determined to be intersected with the reference temporal range, determining that the certain candidate metadata is the target metadata.

In an embodiment, according to temporal information of a trajectory in each piece of candidate metadata, respectively determining a temporal range corresponding to each piece of candidate metadata may comprise: for each piece of candidate metadata, using a start time of the trajectory in the candidate metadata as an upper limit of the temporal range corresponding to the candidate metadata, and using an end time of the trajectory in the candidate metadata an a lower limit of the temporal range corresponding to the candidate metadata.

In the embodiments of the present application, determining the target metadata by the temporal range may satisfy both query efficiency and query accuracy compared with by only relying on the start time or end time of the trajectory and comparing generation time point of each point included in the trajectory.

In some implementations, the acquiring a target trajectory according to the target metadata specifically may comprise the following steps: determining a query type corresponding to the query information of the plurality of types; according to the query type, searching, from a corresponding relationship established in advance between query types and acquisition manners, a target acquisition manner corresponding to the determined query type; and acquiring, according to the target metadata, the target trajectory by utilizing the target acquisition manner.

In an embodiment, there may be a plurality means of determining a query type corresponding to the query information of the plurality of types. For example, it is possible to respectively input different query information into a pre-trained classification model to obtain a query type corresponding to the query information. The classification model is trained by utilizing sample query information and query type labels of the sample query information. Alternatively, for example, it is possible to search a query type corresponding to the query information of the plurality of types according to a corresponding relationship established in advance between query information and query types.

In the embodiments of the present application, by determining a query type corresponding to the query information of the plurality of types, and then determining a target acquisition manner corresponding to the query type, it is possible to cope with a situation that different query information corresponds to different query granularities, and implement acquisition of the target trajectory by employing different target acquisition manners for different query granularities, thereby ensuring the accuracy of the target trajectory.

The process of determining a query type and acquiring a target trajectory by utilizing the target acquisition manner is specifically explained below in the form of an optional embodiment.

In some implementations, the metadata comprises an object identifier of a moving object to which a trajectory belongs and temporal information of the trajectory.

In an embodiment, the determining a query type corresponding to the query information of the plurality of types specifically may comprise the following step: determining that the query type is a direct acquisition type if the query information of the plurality of types comprises a reference temporal range and a reference object identifier.

In an embodiment, the acquiring, according to the target metadata, the target trajectory by utilizing the target acquisition manner specifically may comprise the following steps: processing the target metadata by utilizing an identifier generation manner set in advance, to obtain a target metadata identifier; and according to the target metadata identifier, searching, from a corresponding relationship established in advance between metadata identifiers and trajectories, a target trajectory corresponding to the target metadata identifier.

In an embodiment, there may be multiple means of processing the target metadata by utilizing an identifier generation manner set in advance, to obtain a target metadata identifier. For example, it is possible to search, according to the target metadata, a corresponding relationship established in advance between metadata and metadata identifiers, to obtain a target metadata identifier. Alternatively, for example, it is possible to input the target metadata into a specified hash model, to obtain a target metadata identifier. The specified hash model is used for obtaining an identifier of the metadata or an identifier of a storage location of the metadata. This step is similar to the process shown in FIG. 2 in the above embodiment, and the distinction lies in that the data processed here is the target metadata.

Since during trajectory query for the query information comprising the reference temporal range and the reference object identifier, the finest-granularity information in a temporal dimension and a moving object dimension is temporal information of a trajectory and an object identifier to which it belongs, the embodiments of the present application may take an acquisition manner corresponding to the direct acquisition type, which satisfies both the accuracy and efficiency of the trajectory query.

In some implementations, the above metadata comprises spatial position information of the trajectory.

In an embodiment, the determining a query type corresponding to the query information of the plurality of types specifically may comprise the following step: determining that the query type is a filtering acquisition type if the query information of the plurality of types comprises a reference spatial position range;

In an embodiment, the acquiring, according to the target metadata, the target trajectory by utilizing the target acquisition manner specifically may comprise the following steps: processing the target metadata by utilizing an identifier generation manner set in advance, to obtain a target metadata identifier; according to the target metadata identifier, searching, from a corresponding relationship established in advance between metadata identifiers and trajectories, candidate trajectories corresponding to the target metadata identifier; and determining, from a plurality of searched candidate trajectories, a target trajectory whose position relationship with the reference spatial position range reaches a specified position relationship.

The step of processing the target metadata by utilizing an identifier generation manner set in advance to obtain a target metadata identifier, is similar to the step expressed in the same manner in the above embodiment where the query type is a direct acquisition type. The distinction lies in different metadata as processed. The same parts will not be repeated here, and the details thereof may refer to the description in the above embodiment where the query type is a direct acquisition type. Moreover, there specifically may be multiple means of determining, from a plurality of searched candidate trajectories, a target trajectory whose position relationship with the reference spatial position range reaches a specified position relationship. For example, it is possible to compare a position relationship between spatial position information of each trajectory point included in a candidate trajectory and the reference spatial range, and then determine that this candidate trajectory is the target trajectory if the position relationship corresponding to each trajectory point reaches the specified position relationship. Alternatively, for example, it is possible to compare a position relationship between spatial position information respectively of a start point and an end point included in a candidate trajectory and the reference spatial range, and then determine that this candidate trajectory is the target trajectory if the position relationships corresponding to both the start point and the end point reach the specified position relationship. The specified position relationship may comprise: coincidence, intersection, a spaced distance reaching a distance threshold, etc.

In the embodiments of the present application, in a situation that the query information of the plurality of types comprises a reference spatial position range, the query type is determined to be a filtering acquisition type, thereby further screening, at a finer granularity, candidate spatial position information by the specified position relationship, and improving the accuracy of the target trajectory.

In some implementations, the metadata of a trajectory may comprise a count of points included in the trajectory, and accordingly, the query information of the plurality of types may comprise a count of reference points. In this way, a piece of candidate metadata having a count of points identical to the count of reference points or a difference value being less than a difference threshold, may be determined as the target metadata. Moreover, the query information comprises the count of reference points, and the query type may be the direct acquisition type.

In some implementations, the trajectory query may be applied to fields such as autonomous driving, shared travel, and public safety, etc. Moreover, update and iteration in various fields require computing and processing involved in the trajectory query to be expanded accordingly. To this end, a trajectory management system employing a separate architecture of computing and storage has emerged to achieve the effect that a computing layer and a storage layer can be expanded independently.

Figure 5:
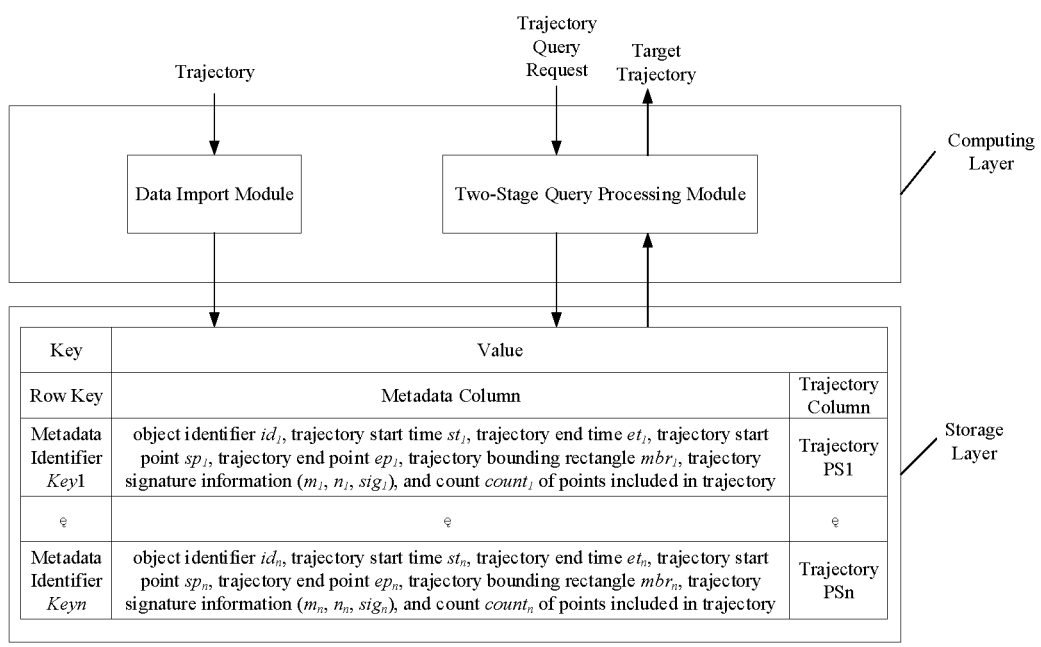
FIG. 5 is an exemplary diagram of an application scenario where a trajectory query method provided in another embodiment of the present application is applied to a trajectory management system.

Exemplarily, as shown in FIG. 5, which is an exemplary diagram of an application scenario 500 where a trajectory query method provided in another embodiment of the present application is applied to a trajectory management system, the trajectory management system may comprise a computing layer and a storage layer. The computing layer comprises a data import module and a two-stage query processing module. For example, the computing layer may generate metadata used for describing trajectories, and metadata identifiers of the metadata, and then establish, in the form of key values, a corresponding relationship between trajectories inserted with metadata and metadata identifiers. For example, the key values may be a key value structure stored in the storage layer shown in FIG. 5. On this basis, after the two-stage query processing module of the computing layer acquires a trajectory query request, candidate metadata and target metadata are obtained from the storage layer through a first query stage, a target trajectory is obtained from the storage layer through a second query stage, and then the target trajectory is returned as a result of the trajectory query request. The first query stage is the same as the steps about obtaining candidate metadata and target metadata in the above embodiment of FIG. 1 and the optional embodiments, and the second query stage is the same as the steps about obtaining a target trajectory in the above embodiment of FIG. 1 and the optional embodiments.

Moreover, in the application scenario shown in FIG. 5, in order to further improve the scalability of the computing layer and the storage layer, the computing layer and the storage layer may interact therebetween by means of network transmission. For example, assuming that a trajectory averagely includes 100 points, the storage space occupied by metadata is usually only 4% of the complete trajectory. Therefore, by means of the solution provided in the present application, not only may the efficiency of trajectory query be improved, but also the network transmission cost consumed by direct processing the complete trajectory may be greatly reduced by filtering based on metadata, candidate metadata, and target metadata in the above first and second stages.

Figure 6:
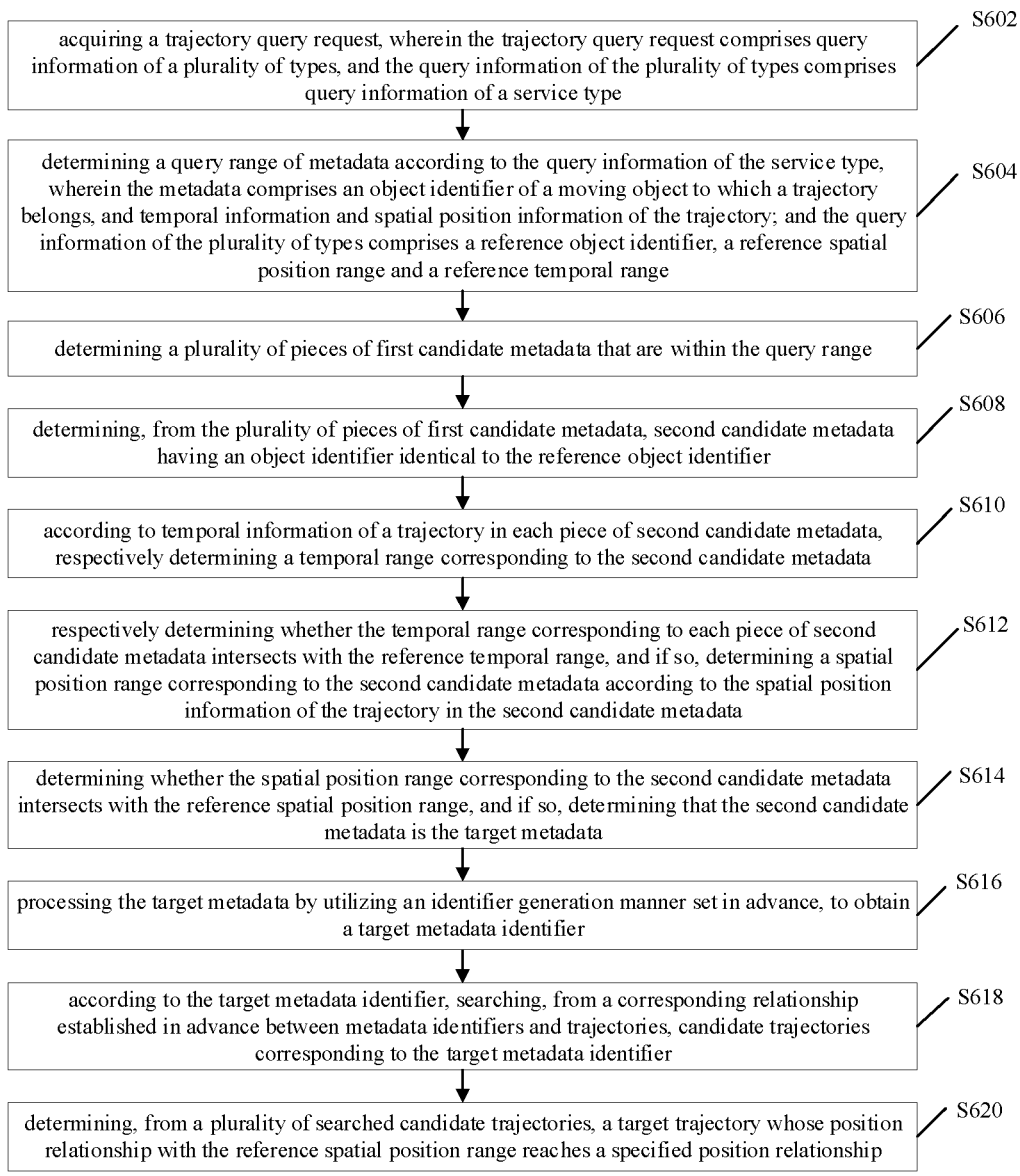
FIG. 6 is a processing flow chart of a trajectory query method applied to a trajectory management system provided in another embodiment of the present application.

In some implementations, the trajectory query method will be further explained below with reference to FIG. 6 by taking an integration of the above embodiment of FIG. 1 and some optional embodiments of FIG. 1 as an example. FIG. 6 shows a processing flow chart of a trajectory query method 600 applied to a trajectory management system provided in another embodiment of the present application, which may comprise the following steps S602 to S620.

At step S602, acquiring a trajectory query request, wherein the trajectory query request comprises query information of a plurality of types, and the query information of the plurality of types comprises query information of a service type.

At step S604, determining a query range of metadata according to the query information of the service type, wherein the metadata comprises an object identifier of a moving object to which a trajectory belongs, and temporal information and spatial position information of the trajectory; and the query information of the plurality of types comprises a reference object identifier, a reference spatial position range and a reference temporal range.

At step S606, determining a plurality of pieces of first candidate metadata that are within the query range.

At step S608, determining, from the plurality of pieces of first candidate metadata, second candidate metadata having an object identifier identical to the reference object identifier.

At step S610, according to temporal information of a trajectory in each piece of second candidate metadata, respectively determining a temporal range corresponding to the second candidate metadata.

At step S612, respectively determining whether the temporal range corresponding to each piece of second candidate metadata intersects with the reference temporal range, and if the temporal range corresponding to a certain second candidate metadata is determined to be intersected with the reference temporal range, determining a spatial position range corresponding to the certain second candidate metadata according to the spatial position information of the trajectory in the certain second candidate metadata.

At step S614, determining whether the spatial position range corresponding to the certain second candidate metadata intersects with the reference spatial position range, and if so, determining that the certain second candidate metadata is target metadata.

At step S616, processing the target metadata by utilizing an identifier generation manner set in advance, to obtain a target metadata identifier.

At step S618, according to the target metadata identifier, searching, from a corresponding relationship established in advance between metadata identifiers and trajectories, candidate trajectories corresponding to the target metadata identifier.

At step S620, determining, from a plurality of searched candidate trajectories, a target trajectory whose position relationship with the reference spatial position range reaches a specified position relationship.

Various steps in the above implementation are the same as the steps expressed in the same manner in the embodiment of FIG. 1 and some optional embodiments of FIG. 1. They will not be repeated here, and the details thereof may refer to the description of the embodiment of FIG. 1 and some optional embodiments of FIG. 1.

Figure 7:
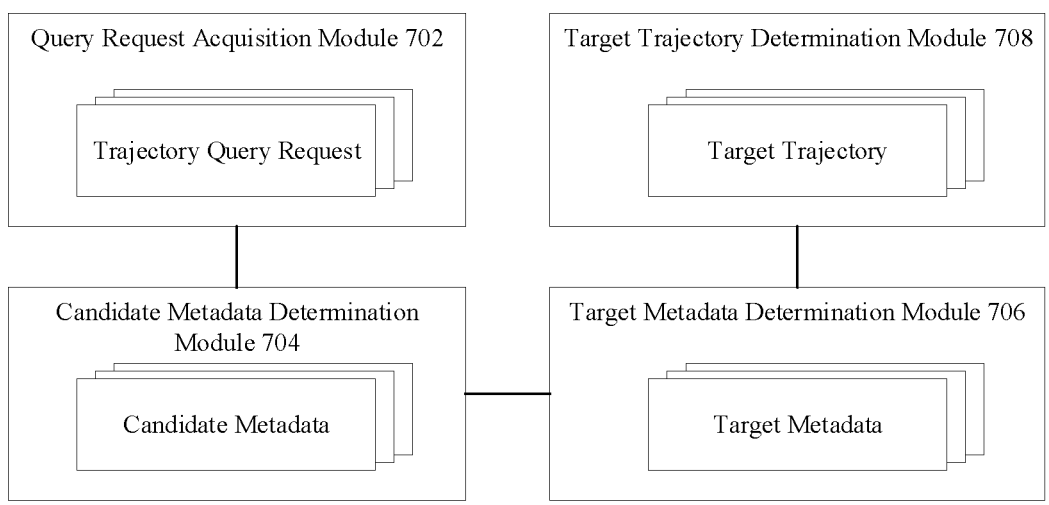
FIG. 7 is a structural schematic diagram of a trajectory query apparatus provided in an embodiment of the present application.

Corresponding to the above method embodiments, the present application further provides an embodiment of a trajectory query apparatus. FIG. 7 shows a structural schematic diagram of a trajectory query apparatus 700 provided in an embodiment of the present application. As shown in FIG. 7, the apparatus 700 comprises: a query request acquisition module 702, configured to acquire a trajectory query request, wherein the trajectory query request comprises query information of a plurality of types, and the query information of the plurality of types comprises query information of a service type; a candidate metadata determination module 704, configured to, according to the query information of the service type, determine a query range of metadata, and determine a plurality of pieces of candidate metadata that are within the query range, wherein the metadata is a digest of a trajectory; a target metadata determination module 706, configured to determine, from the plurality of pieces of candidate metadata, target metadata that matches the query information of the plurality of types; and a target trajectory determination module 708, configured to acquire a target trajectory according to the target metadata.

In the embodiments of the present application, by determining this target metadata from the plurality of pieces of candidate metadata as determined by utilizing the query range, this may greatly alleviate reduction in processing speed caused by determining the target metadata from all metadata. Moreover, the metadata is a digest of a trajectory, which is smaller in size than the trajectory. Therefore, by determining, from the plurality of pieces of candidate metadata, target metadata that matches the query information of the plurality of types, thereby acquiring a target trajectory according to the target metadata, this may greatly alleviate reduction in processing speed caused by processing non-target trajectories. Therefore, by means of the solution of the embodiments of the present application, the trajectory query speed can be increased.

In some implementations, the metadata comprises an object identifier of a moving object to which a trajectory belongs and/or spatiotemporal information of the trajectory; the query information of the plurality of types comprises a reference object identifier and/or a reference spatiotemporal range; and target metadata determination module 706 is further configured to: determine, from the plurality of pieces of candidate metadata, candidate metadata with an object identifier identical to the reference object identifier as the target metadata; and/or, determine, from the plurality of pieces of candidate metadata, candidate metadata with spatiotemporal information intersecting with the reference spatiotemporal range as the target metadata.

In some implementations, the spatiotemporal information comprises a bounding rectangle of the trajectory; the reference spatiotemporal range comprises a reference spatial position range; and target metadata determination module 706 is further configured to: determine a spatial position range of an area formed by a bounding rectangle of each trajectory; respectively determine whether the spatial position range of the area formed by the bounding rectangle of each trajectory intersects with the reference spatial position range; and if the spatial position range of the area formed by the bounding rectangle of a certain trajectory is determined to be intersected with the reference spatial position range, determine that candidate metadata to which the bounding rectangle of the certain trajectory belongs is the target metadata.

In some implementations, the spatiotemporal information further comprises bounding rectangles of respective sub-trajectories, and the respective sub-trajectories are a plurality of trajectory segments obtained by segmenting the trajectory; and target metadata determination module 706 is further configured to: respectively determine spatial position ranges of areas formed by bounding rectangles of the respective sub-trajectories corresponding to the certain trajectory; determine whether a spatial position range of an area formed by a bounding rectangle of at least one sub-trajectory intersects with the reference spatial position range; and if so, determine that candidate metadata to which the bounding rectangle of the at least one sub-trajectory belongs is the target metadata.

In some implementations, the metadata comprises temporal information and spatial position information of the trajectory; the reference spatiotemporal range comprises a reference spatial position range and a reference temporal range; and target metadata determination module 706 is further configured to: according to temporal information of a trajectory in each piece of candidate metadata, respectively determine a temporal range corresponding to the candidate metadata; respectively determine whether the temporal range corresponding to each piece of candidate metadata intersects with the reference temporal range, and if the temporal range corresponding to a certain candidate metadata is determined to be intersected with the reference temporal range, determine a spatial position range corresponding to the certain candidate metadata according to the spatial position information of the trajectory in the certain candidate metadata; and determine whether the spatial position range corresponding to the certain candidate metadata intersects with the reference spatial position range, and if so, determining that the certain candidate metadata is the target metadata.

In some implementations, the metadata comprises temporal information of the trajectory; the reference spatiotemporal range comprises a reference temporal range; and target metadata determination module 706 is further configured to: according to temporal information of a trajectory in each piece of candidate metadata, respectively determine a temporal range corresponding to the candidate metadata; and respectively determine whether the temporal range corresponding to each piece of candidate metadata intersects with the reference temporal range, and if the temporal range corresponding to a certain candidate metadata is determined to be intersected with the reference temporal range, determine that the certain candidate metadata is the target metadata.

In some implementations, target trajectory determination module 708 is further configured to: determine a query type corresponding to the query information of the plurality of types; according to the query type, searching, from a corresponding relationship established in advance between query types and acquisition manners, a target acquisition manner corresponding to the determined query type; and acquiring, according to the target metadata, the target trajectory by utilizing the target acquisition manner.

In some implementations, the metadata comprises an object identifier of a moving object to which a trajectory belongs and temporal information of the trajectory; and target trajectory determination module 708 is further configured to: determine that the query type is a direct acquisition type if the query information of the plurality of types comprises a reference temporal range and a reference object identifier; and process the target metadata by utilizing an identifier generation means set in advance, to obtain a target metadata identifier; and according to the target metadata identifier, searching, from a corresponding relationship established in advance between metadata identifiers and trajectories, a target trajectory corresponding to the target metadata identifier.

In some implementations, the metadata comprises spatial position information of the trajectory; and target trajectory determination module 708 is further configured to: determine that the query type is a filtering acquisition type if the query information of the plurality of types comprises a reference spatial position range; processing the target metadata by utilizing an identifier generation manner set in advance, to obtain a target metadata identifier; according to the target metadata identifier, searching, from a corresponding relationship established in advance between metadata identifiers and trajectories, candidate trajectories corresponding to the target metadata identifier; and determine, from a plurality of searched candidate trajectories, a target trajectory whose position relationship with the reference spatial position range reaches a specified position relationship.

In some implementations, the above trajectory query apparatus of the embodiment of the present application further comprises a metadata storage module, configured to: for each trajectory having been stored, generate metadata used for describing the trajectory; respectively serialize each piece of metadata, and insert serialized metadata into a corresponding trajectory, to obtain a processed trajectory; according to a preset identifier generation manner, respectively process each piece of metadata, to obtain a metadata identifier of the metadata; and establish a corresponding relationship between processed trajectories and metadata identifiers.

Described above is a schematic solution of the trajectory query apparatus according to this embodiment. It should be noted that the technical solution of this trajectory query apparatus has one and the same concept as the technical solution of the trajectory query method described above. Any details not detailed in the technical solution of the trajectory query apparatus may refer to the description of the technical solution of the trajectory query method described above.

Figure 8:
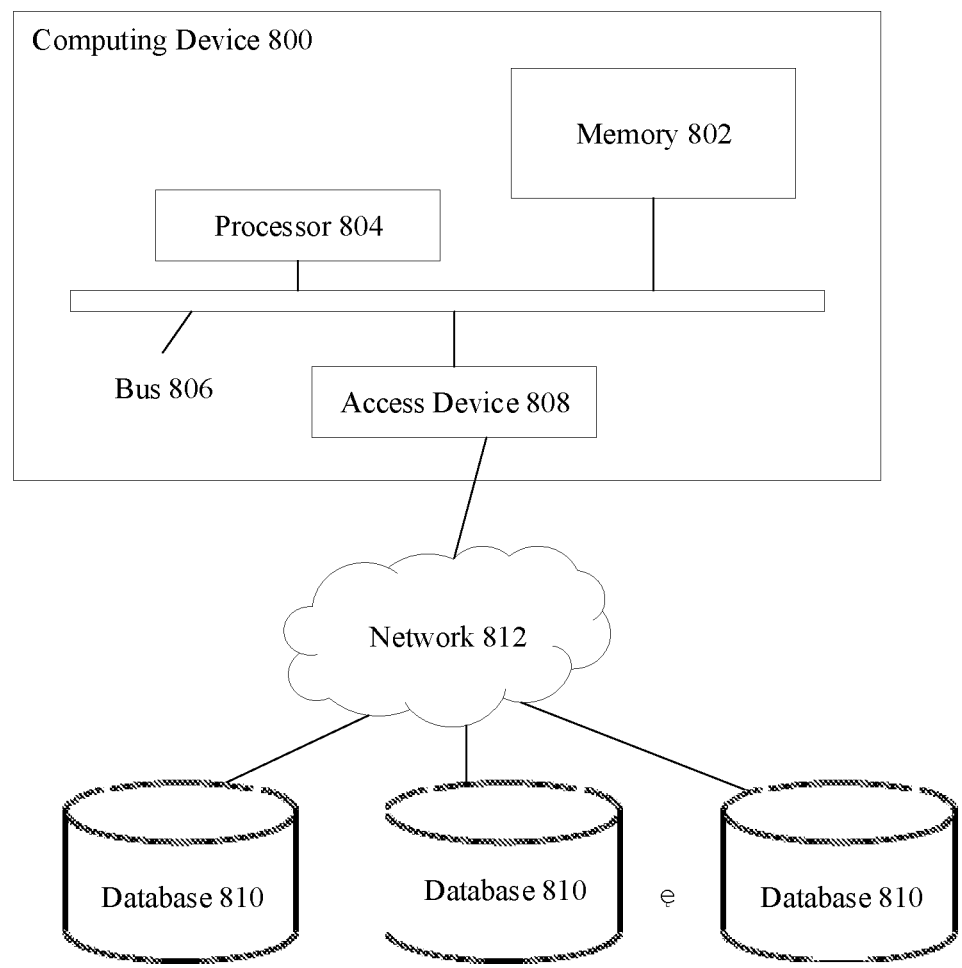
FIG. 8 is a structural block diagram of a computing device provided in an embodiment of the present application.

FIG. 8 shows a structural block diagram of a computing device 800 provided according to an embodiment of the present application. Parts of this computing device 800 include, but are not limited to, a memory 802 and a processor 804. Processor 804 and memory 802 are connected through a bus 806, and a database 810 is used for saving data.

In some embodiments, computing device 800 further comprises an access device 808 that enables computing device 800 to communicate via one or more networks 812. Examples of these networks include a public switched telephone network (PSTN), a local area network (LAN), a wide area network (WAN), a personal area network (PAN), or a combination of communication networks such as the Internet. Access device 808 may comprise one or more of any types of wired or wireless network interfaces (e.g., a network interface card (NIC)), such as an IEEE 802.11 wireless local area network (WLAN) wireless interface, a worldwide interconnection for microwave access (Wi-MAX) interface, an Ethernet interface, a universal serial bus (USB) interface, a cellular network interface, a Bluetooth interface, a near field communication (NFC) interface, etc.

In an embodiment, the above parts of computing device 800 and other parts not shown in FIG. 8 may also be connected to each other through, for example, a bus. It should be understood that the structural block diagram of the computing device shown in FIG. 8 is for illustrative purposes only and does not limit the scope of the present application. Those skilled in the art may add or replace other parts as needed.

Computing device 800 may be any type of stationary or mobile computing device, including a mobile computer or mobile computing device (e.g., a tablet computer, a personal digital assistant, a laptop computer, a notebook computer, a netbook, etc.), a mobile telephone (e.g., a smartphone), a wearable computing device (e.g., a smart watch, smart glasses, etc.) or other types of mobile devices, or stationary computing devices such as a desktop computer or PC. Computing device 800 may also be a mobile or stationary server.

Processor 804 is used for executing computer-executable instructions as below that, when executed by the processor, implement the steps of the trajectory query method described above.

Described above is a schematic solution of the computing device in the embodiment of the present application. It should be noted that the technical solution of this computing device has one and the same concept as the technical solution of the trajectory query method described above. Any details not detailed in the technical solution of the computing device may refer to the description of the technical solution of the trajectory query method described above.

An embodiment of the present application further provides a computer-readable storage medium storing computer-executable instructions that, when executed by a processor, implement the steps of the trajectory query method described above.

Described above is a schematic solution of the computer-readable storage medium in this embodiment. It should be noted that the technical solution of this computer-readable storage medium has one and the same concept as the technical solution of the trajectory query method described above. Any details not detailed in the technical solution of the computer-readable storage medium may refer to the description of the technical solution of the trajectory query method described above.

An embodiment of the present application further provides a computer program, wherein when the computer program is executed in a computer, the computer is caused to execute the steps of the trajectory query method described above.

Described above is a schematic solution of the computer program in this embodiment. It should be noted that the technical solution of this computer program has one and the same concept as the technical solution of the trajectory query method described above. Any details not detailed in the technical solution of the computer program may refer to the description of the technical solution of the trajectory query method described above.

In an embodiment of the present application, a trajectory query request is acquired, which comprises query information of a plurality of types, wherein the query information of the plurality of types comprises query information of a service type; according to the query information of the service type, a query range of metadata is determined, then a plurality of pieces of candidate metadata that are within the query range are determined, and target metadata that matches the query information of the plurality of types is determined from the plurality of pieces of candidate metadata; and a target trajectory is acquired according to the target metadata. By determining this target metadata from the plurality of pieces of candidate metadata as determined by utilizing the query range, this may greatly reduce the possibility of a lower processing speed caused by determining the target metadata from all metadata. Moreover, the metadata is a digest of a trajectory, which is smaller in size than the trajectory. Therefore, by determining, from the plurality of pieces of candidate metadata, target metadata that matches the query information of the plurality of types, thereby acquiring a target trajectory according to the target metadata, this may greatly reduce the possibility of a lower processing speed caused by processing non-target trajectories. Therefore, by means of this solution, the trajectory query speed can be increased.

Described above are particular embodiments of the present application. Other embodiments are within the scope of the attached claims. In some cases, actions or steps recorded in the claims may be executed in a different order than in the embodiments, and may still achieve the desired result. Additionally, the processes depicted in the drawings do not necessarily require a particular or continuous order to achieve the desired result. In some implementations, multi-tasking and parallel processing are also possible or may be advantageous.

The above computer instructions include computer program code, which may be in a form of source code or object code, an executable file, or some intermediate form. The above computer-readable medium may include: any entity or apparatus capable of carrying the computer program code, a recording medium, a USB flash drive, a portable hard drive, a magnetic disc, an optical disc, a computer memory, a read-only memory (ROM), a random access memory (RAM), an electrical carrier signal, a telecommunications signal, and a software distribution medium, etc. It should be noted that content contained in the computer-readable medium may be appropriately increased or decreased according to the requirements of legislation and patent practice in a jurisdiction. For example, in some jurisdictions, according to legislation and patent practice, a computer-readable medium does not include an electrical carrier signal or a telecommunication signal.

It should be noted that for the convenience of description, the method embodiments described precedingly are all expressed as a combination of a series of actions. However, those skilled in the art should be aware that the embodiments of the present application are not limited by the described action order, because according to the embodiments of the present application, certain steps may proceed in other orders or at the same time. Furthermore, those skilled in the art should also be aware that the embodiments described in the present application are all preferred embodiments, and the actions and modules involved are not all definitely necessary for the embodiments of the present application.

In the above embodiments, different focuses are put on their respective descriptions. For parts not detailed in a certain embodiment, reference may be made to the relevant descriptions of other embodiments.

The preferred embodiments disclosed above are merely used to help elaborate the present application. The optional embodiments neither exhaustively recite all the details, nor limit this invention to the described specific implementations. Obviously, according to the content of the embodiments of the present application, many modifications and changes may be conducted. This specification selects and specifically describes these embodiments in order to better explain the principles and practical applications of the embodiments of the present application, such that those skilled in the art can well understand and utilize this specification. This specification is limited only by the claims and their entire scope and equivalents.

What is claimed is:

1. A trajectory query method, implemented by one or more computing devices, comprising:
   acquiring a trajectory query request, wherein the trajectory query request comprises query information of a plurality of types, and the query information of the plurality of types comprises query information of a service type, wherein different trajectories correspond to query information of different service types;
   determining a query range of metadata according to the query information of the service type, wherein the metadata is configured for describing a trajectory and is a digest of the trajectory, the trajectory is a collection of points generated by movement of a moving object;
   determining a plurality of pieces of candidate metadata that are within the query range, and determining, from the plurality of pieces of candidate metadata, target metadata that matches the query information of the plurality of types; and
   acquiring a target trajectory according to the target metadata.

2. The method according to claim 1, wherein the metadata comprises an object identifier of a moving object to which the trajectory belongs and/or spatiotemporal information of the trajectory; and the query information of the plurality of types comprises a reference object identifier and/or a reference spatiotemporal range; and
   the determining, from the plurality of pieces of candidate metadata, the target metadata that matches the query information of the plurality of types comprises:
   determining, from the plurality of pieces of candidate metadata, candidate metadata with an object identifier identical to the reference object identifier as the target metadata; and/or,
   determining, from the plurality of pieces of candidate metadata, candidate metadata with spatiotemporal information intersecting with the reference spatiotemporal range as the target metadata.

3. The method according to claim 2, wherein the spatiotemporal information comprises a bounding rectangle of the trajectory, and the reference spatiotemporal range comprises a reference spatial position range; and
   the determining, from the plurality of pieces of candidate metadata, the target metadata that matches the query information of the plurality of types comprises:
   determining a spatial position range of an area formed by a bounding rectangle of each trajectory;
   respectively determining whether the spatial position range of the area formed by the bounding rectangle of each trajectory intersects with the reference spatial position range; and
   if the spatial position range of the area formed by the bounding rectangle of a certain trajectory is determined to be intersected with the reference spatial position range, determining that candidate metadata to which the bounding rectangle of the certain trajectory belongs is the target metadata.

4. The method according to claim 3, wherein the spatiotemporal information further comprises bounding rectangles of respective sub-trajectories, and the respective sub-trajectories are a plurality of trajectory segments obtained by segmenting the trajectory; and
   the determining that the candidate metadata to which the bounding rectangle of the certain trajectory belongs is the target metadata comprises:
   respectively determining spatial position ranges of areas formed by bounding rectangles of respective sub-trajectories corresponding to the certain trajectory;
   determining whether the spatial position range of the area formed by the bounding rectangle of at least one sub-trajectory intersects with the reference spatial position range; and
   if the spatial position range of the area formed by the bounding rectangle of the at least one sub-trajectory is determined to be intersected with the reference spatial position range, determining that candidate metadata to which the bounding rectangle of the at least one sub-trajectory belongs is the target metadata.

5. The method according to claim 2, wherein the metadata comprises temporal information and spatial position information of the trajectory; the reference spatiotemporal range comprises a reference spatial position range and a reference temporal range; and
   the determining, from the plurality of pieces of candidate metadata, the candidate metadata with the spatiotemporal information intersecting with the reference spatiotemporal range as the target metadata comprises:
   according to temporal information of a trajectory in each piece of candidate metadata, respectively determining a temporal range corresponding to each piece of candidate metadata;
   respectively determining whether the temporal range corresponding to each piece of candidate metadata intersects with the reference temporal range, and if the temporal range corresponding to a certain candidate metadata is determined to be intersected with the reference temporal range, determining a spatial position range corresponding to the certain candidate metadata according to the spatial position information of the trajectory in the certain candidate metadata; and
   determining whether the spatial position range corresponding to the certain candidate metadata intersects with the reference spatial position range, and if the spatial position range corresponding to the certain candidate metadata is determined to be intersected with the reference spatial position range, determining that the certain candidate metadata is the target metadata.

6. The method according to claim 2, wherein the metadata comprises temporal information of the trajectory; and the reference spatiotemporal range comprises a reference temporal range; and
   the determining, from the plurality of pieces of candidate metadata, the candidate metadata with the spatiotemporal information intersecting with the reference spatiotemporal range as the target metadata comprises:

according to temporal information of a trajectory in each piece of candidate metadata, respectively determining a temporal range corresponding to each piece of candidate metadata; and respectively determining whether the temporal range corresponding to each piece of candidate metadata intersects with the reference temporal range, and if the temporal range corresponding to a certain candidate metadata is determined to be intersected with the reference temporal range, determining that the certain candidate metadata is the target metadata.

7. The method according to claim 1, wherein the acquiring the target trajectory according to the target metadata comprises:

determining a query type corresponding to the query information of the plurality of types;

according to the query type, searching, from a corresponding relationship established in advance between query types and acquisition manners, a target acquisition manner corresponding to the determined query type; and acquiring, according to the target metadata, the target trajectory by utilizing the target acquisition manner.

8. The method according to claim 7, wherein the metadata comprises an object identifier of a moving object to which the trajectory belongs and temporal information of the trajectory;

the determining the query type corresponding to the query information of the plurality of types comprises:

determining that the query type is a direct acquisition type if the query information of the plurality of types comprises a reference temporal range and a reference object identifier; and the acquiring, according to the target metadata, the target trajectory by utilizing the target acquisition manner comprises:

processing the target metadata by utilizing an identifier generation manner set in advance, to obtain a target metadata identifier; and according to the target metadata identifier, searching, from a corresponding relationship established in advance between metadata identifiers and trajectories, the target trajectory corresponding to the target metadata identifier.

9. The method according to claim 7, wherein the metadata comprises spatial position information of the trajectory;

the determining the query type corresponding to the query information of the plurality of types comprises:

determining that the query type is a filtering acquisition type if the query information of the plurality of types comprises a reference spatial position range; and the acquiring, according to the target metadata, the target trajectory by utilizing the target acquisition manner comprises:

processing the target metadata by utilizing an identifier generation manner set in advance, to obtain a target metadata identifier;

according to the target metadata identifier, searching, from a corresponding relationship established in advance between metadata identifiers and trajectories, candidate trajectories corresponding to the target metadata identifier; and determining, from a plurality of searched candidate trajectories, the target trajectory whose position relationship with the reference spatial position range reaches a specified position relationship.

10. The method according to claim 1, prior to the acquiring the trajectory query request, further comprising:

for each trajectory having been stored, generating metadata used for describing the trajectory;

serializing each piece of metadata respectively, and inserting serialized metadata into a corresponding trajectory, to obtain a processed trajectory;

processing each piece of metadata respectively according to a preset identifier generation manner, to obtain a metadata identifier of the metadata; and establishing a corresponding relationship between the processed trajectories and the metadata identifiers.

11. A computing device, comprising:

a memory and a processor, wherein the memory is used for storing computer-executable instructions, and the processor is used for executing the computer-executable instructions to perform operations of:

acquiring a trajectory query request, wherein the trajectory query request comprises query information of a plurality of types, and the query information of the plurality of types comprises query information of a service type, wherein different trajectories correspond to query information of different service types;

determining a query range of metadata according to the query information of the service type, wherein the metadata is configured for describing a trajectory and is a digest of the trajectory, the trajectory is a collection of points generated by movement of a moving object;

determining a plurality of pieces of candidate metadata that are within the query range, and determining, from the plurality of pieces of candidate metadata, target metadata that matches the query information of the plurality of types; and acquiring a target trajectory according to the target metadata.

12. A non-transitory computer-readable storage medium, which stores computer-executable instructions, wherein the computer-executable instructions, when executed by a processor, implement the steps of the trajectory query method of claim 1.

13. The computing device according to claim 11, wherein the metadata comprises an object identifier of a moving object to which the trajectory belongs and/or spatiotemporal information of the trajectory; and the query information of the plurality of types comprises a reference object identifier and/or a reference spatiotemporal range; and wherein the processor is used for executing the computer-executable instructions to perform further operations of:

determining, from the plurality of pieces of candidate metadata, candidate metadata with an object identifier identical to the reference object identifier as the target metadata; and/or, determining, from the plurality of pieces of candidate metadata, candidate metadata with spatiotemporal information intersecting with the reference spatiotemporal range as the target metadata.

14. The computing device according to claim 13, wherein the spatiotemporal information comprises a bounding rectangle of the trajectory, and the reference spatiotemporal range comprises a reference spatial position range; and wherein the processor is used for executing the computer-executable instructions to perform further operations of:

determining a spatial position range of an area formed by a bounding rectangle of each trajectory;

respectively determining whether the spatial position range of the area formed by the bounding rectangle of each trajectory intersects with the reference spatial position range; and if the spatial position range of the area formed by the bounding rectangle of a certain trajectory is determined to be intersected with the reference spatial position range, determining that candidate metadata to which the bounding rectangle of the certain trajectory belongs is the target metadata.

15. The computing device according to claim 14, wherein the spatiotemporal information further comprises bounding rectangles of respective sub-trajectories, and the respective sub-trajectories are a plurality of trajectory segments obtained by segmenting the trajectory; and wherein the processor is used for executing the computer-executable instructions to perform further operations of:

respectively determining spatial position ranges of areas formed by bounding rectangles of respective sub-trajectories corresponding to the certain trajectory;

determining whether the spatial position range of the area formed by the bounding rectangle of at least one sub-trajectory intersects with the reference spatial position range; and if the spatial position range of the area formed by the bounding rectangle of the at least one sub-trajectory is determined to be intersected with the reference spatial position range, determining that candidate metadata to which the bounding rectangle of the at least one sub-trajectory belongs is the target metadata.

16. The computing device according to claim 13, wherein the metadata comprises temporal information and spatial position information of the trajectory; the reference spatiotemporal range comprises a reference spatial position range and a reference temporal range; and wherein the processor is used for executing the computer-executable instructions to perform further operations of:

according to temporal information of a trajectory in each piece of candidate metadata, respectively determining a temporal range corresponding to each piece of candidate metadata;

respectively determining whether the temporal range corresponding to each piece of candidate metadata intersects with the reference temporal range, and if the temporal range corresponding to a certain candidate metadata is determined to be intersected with the reference temporal range, determining a spatial position range corresponding to the certain candidate metadata according to the spatial position information of the trajectory in the certain candidate metadata; and determining whether the spatial position range corresponding to the certain candidate metadata intersects with the reference spatial position range, and if the spatial position range corresponding to the certain candidate metadata is determined to be intersected with the reference spatial position range, determining that the certain candidate metadata is the target metadata.

17. The computing device according to claim 13, wherein the metadata comprises temporal information of the trajectory; and the reference spatiotemporal range comprises a reference temporal range; and wherein the processor is used for executing the computer-executable instructions to perform further operations of:

according to temporal information of a trajectory in each piece of candidate metadata, respectively determining a temporal range corresponding to each piece of candidate metadata; and respectively determining whether the temporal range corresponding to each piece of candidate metadata intersects with the reference temporal range, and if the temporal range corresponding to a certain candidate metadata is determined to be intersected with the reference temporal range, determining that the certain candidate metadata is the target metadata.

18. The computing device according to claim 11, wherein the processor is used for executing the computer-executable instructions to perform further operations of:

determining a query type corresponding to the query information of the plurality of types;

according to the query type, searching, from a corresponding relationship established in advance between query types and acquisition manners, a target acquisition manner corresponding to the determined query type; and acquiring, according to the target metadata, the target trajectory by utilizing the target acquisition manner.

19. The computing device according to claim 18, wherein the metadata comprises an object identifier of a moving object to which the trajectory belongs and temporal information of the trajectory; and wherein the processor is used for executing the computer-executable instructions to perform further operations of:

determining that the query type is a direct acquisition type if the query information of the plurality of types comprises a reference temporal range and a reference object identifier; and processing the target metadata by utilizing an identifier generation manner set in advance, to obtain a target metadata identifier; and according to the target metadata identifier, searching, from a corresponding relationship established in advance between metadata identifiers and trajectories, the target trajectory corresponding to the target metadata identifier.

20. The computing device according to claim 18, wherein the metadata comprises spatial position information of the trajectory; and wherein the processor is used for executing the computer-executable instructions to perform further operations of:

determining that the query type is a filtering acquisition type if the query information of the plurality of types comprises a reference spatial position range; and processing the target metadata by utilizing an identifier generation manner set in advance, to obtain a target metadata identifier;

according to the target metadata identifier, searching, from a corresponding relationship established in advance between metadata identifiers and trajectories, candidate trajectories corresponding to the target metadata identifier; and determining, from a plurality of searched candidate trajectories, the target trajectory whose position relationship with the reference spatial position range reaches a specified position relationship.

* * * * *